(12) United States Patent
Richardson et al.

(10) Patent No.: US 9,288,608 B2
(45) Date of Patent: *Mar. 15, 2016

(54) PROVIDING WEB SERVICE FOR NEW USER ACCOUNT AFTER INSTALLATION OF APPLICATION ON MOBILE DEVICE

(71) Applicant: Lookout, Inc., San Francisco, CA (US)

(72) Inventors: David Richardson, San Francisco, CA (US); Kevin Mahaffey, San Francisco, CA (US); Jonathan Grubb, Los Angeles, CA (US)

(73) Assignee: Lookout, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,832

(22) Filed: Nov. 25, 2014

(65) Prior Publication Data

US 2015/0087270 A1 Mar. 26, 2015

Related U.S. Application Data

(63) Continuation of application No. 13/403,927, filed on Feb. 23, 2012, now Pat. No. 8,938,810.

(60) Provisional application No. 61/445,957, filed on Feb. 23, 2011.

(51) Int. Cl.
*H04L 29/06* (2006.01)
*H04W 4/00* (2009.01)
*H04W 12/12* (2009.01)
*H04L 29/08* (2006.01)
(Continued)

(52) U.S. Cl.
CPC ............... *H04W 4/003* (2013.01); *G06F 8/61* (2013.01); *H04L 67/18* (2013.01); *H04L 67/34* (2013.01); *H04W 8/18* (2013.01); *H04W 12/06* (2013.01); *H04W 12/12* (2013.01); *H04W 4/02* (2013.01)

(58) Field of Classification Search
CPC ......... H04W 4/003; H04W 4/02; H04W 8/18; H04W 12/06; H04W 12/12; G06F 8/61; H04L 67/18; H04L 67/34
USPC ..................... 726/2, 3, 5, 26, 27, 28; 713/182
See application file for complete search history.

(56) References Cited

U.S. PATENT DOCUMENTS 7,813,723 B2 * 10/2010 Bredikhin et al. .......... 455/414.3
8,768,307 B1 * 7/2014 Heins et al. ................ 455/412.1
(Continued)

FOREIGN PATENT DOCUMENTS

EP      1950656 A1 * 7/2008  .............. G06F 9/445
WO      0110089      2/2001

*Primary Examiner* — Sarah Su
(74) *Attorney, Agent, or Firm* — Greenberg Traurig LLP

(57) ABSTRACT

Mobile devices often communicate with network services that require an account. Because it may be undesirable to require user interaction when creating an account, it may be desirable to automatically create an account associating a mobile device to a network service after a new application is installed on the mobile device. In an embodiment, a new application is remotely installed on a mobile device. After the installation, the device monitors itself for an occurrence of an event. In response to detecting the occurrence, the device launches the new application. After the launch, the new application automatically obtains data from the mobile device, and then sends the data to a server that automatically creates an account for the user. The server also provides a service associated with the account.

20 Claims, 5 Drawing Sheets

(51) Int. Cl.
  *G06F 9/445* (2006.01)
  *H04W 8/18* (2009.01)
  *H04W 12/06* (2009.01)
  *H04W 4/02* (2009.01)

(56) References Cited

U.S. PATENT DOCUMENTS

| | | | |
|---|---|---|---|
| 8,938,810 B2* | 1/2015 | Richardson et al. | 726/27 |
| 8,965,356 B2* | 2/2015 | Miller | 455/419 |
| 2003/0065954 A1* | 4/2003 | O'Neill et al. | 713/202 |
| 2004/0172531 A1 | 9/2004 | Little et al. | |
| 2004/0235455 A1* | 11/2004 | Jiang | 455/411 |
| 2005/0288043 A1 | 12/2005 | Lai et al. | |
| 2006/0094403 A1 | 5/2006 | Norefors et al. | |
| 2007/0217582 A1 | 9/2007 | Lesser | |
| 2008/0147799 A1 | 6/2008 | Morris | |
| 2009/0132689 A1* | 5/2009 | Zaltzman et al. | 709/223 |
| 2009/0247122 A1 | 10/2009 | Fitzgerald et al. | |
| 2010/0100591 A1 | 4/2010 | Mahaffey et al. | |
| 2010/0100939 A1 | 4/2010 | Mahaffey et al. | |
| 2010/0100959 A1 | 4/2010 | Mahaffey | |
| 2010/0100963 A1 | 4/2010 | Mahaffey | |
| 2010/0100964 A1 | 4/2010 | Mahaffey et al. | |
| 2010/0130233 A1 | 5/2010 | Parker | |
| 2010/0146500 A1 | 6/2010 | Joubert et al. | |
| 2010/0210240 A1* | 8/2010 | Mahaffey et al. | 455/411 |
| 2011/0047597 A1 | 2/2011 | Mahaffey et al. | |
| 2011/0088081 A1 | 4/2011 | Folkesson et al. | |
| 2011/0141276 A1 | 6/2011 | Borghei | |
| 2011/0155804 A1 | 6/2011 | Dowling et al. | |
| 2011/0159845 A1 | 6/2011 | Sanjeev | |
| 2011/0270766 A1 | 11/2011 | Ramakrishnan et al. | |
| 2011/0283097 A1 | 11/2011 | Weber et al. | |
| 2012/0196571 A1* | 8/2012 | Grkov et al. | 455/411 |
| 2012/0214451 A1* | 8/2012 | Richardson et al. | 455/414.1 |
| 2012/0216292 A1 | 8/2012 | Richardson et al. | |
| 2013/0283377 A1* | 10/2013 | Das et al. | 726/23 |
| 2014/0082363 A1 | 3/2014 | Lee et al. | |

* cited by examiner

PROVIDING WEB SERVICE FOR NEW USER ACCOUNT AFTER INSTALLATION OF APPLICATION ON MOBILE DEVICE

CROSS-REFERENCE TO RELATED APPLICATIONS

This is a continuation application of U.S. Non-Provisional application Ser. No. 13/403,927, filed Feb. 23, 2012, entitled "USER ACCOUNT CREATION INVOLVING A MOBILE DEVICE", by Richardson et al., which itself claims the benefit of and priority to U.S. Provisional Application Ser. No. 61/445,957, filed Feb. 23, 2011, entitled "REMOTE APPLICATION INSTALLATION AND CONTROL FOR A MOBILE DEVICE," by Richardson et al., the entire contents of which applications are incorporated by reference as if fully set forth herein.

FIELD OF THE TECHNOLOGY

At least some embodiments disclosed herein relate to mobile communication devices in general, and more particularly, but not limited to, creating a new account for a user of a mobile device.

BACKGROUND

Mobile devices have evolved beyond simple telephone functionality and are now more complex multi-functional devices. In addition to voice communications, many mobile devices are capable of text messaging, email communications, Internet access, and the ability to run full-featured application software. Mobile devices can use these capabilities to perform online transactions such as banking, stock trading, payments, and other financial activities. Furthermore, mobile devices used by an individual, a business, or a government agency often store confidential or private information in forms such as electronic documents, text messages, access codes, passwords, account numbers, email addresses, personal communications, phone numbers, and financial information.

As the criticality of mobile devices grows, missing devices become an increasingly severe problem. Currently, when a mobile device is lost, a user may try to locate it by calling the device's phone number; however, unless it is within close proximity to the user, the device will not likely be found. If the mobile device is not found, the user must deactivate the account associated with the missing device and transfer it to a new device, which is likely purchased at substantial cost to the user or organization. Any data present on the missing device will be lost unless it is backed up or stored somewhere outside of the device. Re-entering lost data such as contact information and device settings may entail hours of work. In addition, certain types of information being present on a mobile device may require a business or government agency to perform a damaging and costly public breach disclosure.

A malicious person who steals or finds a mobile device may use the device itself or the information stored on it for illegitimate purposes. A stolen device may be used to place phone calls, perform financial transactions, or subject its owner to financial loss in other ways. Furthermore, the confidential or private information on a device may be extracted by an unauthorized individual and used to the detriment of the device's owner. In many cases, the loss of government, business, or personal data is far more problematic than the replacement cost of the mobile device. In the case of government or certain business devices, preventing the data from a lost or stolen device from falling into malicious hands is of extreme importance to national security.

It is desirable for users and administrators to be able to remediate problems associated with lost or stolen devices as quickly and easily as possible. In organizations that utilize multiple types of mobile devices, each with separate management systems, dealing with a lost or stolen device may be a complex process. Furthermore, end users typically must contact and rely on an administrator in order to secure a missing device, often resulting in a period of several days between the time of loss and when remote security actions are finally initiated. Such a delay significantly increases the risk of financial or information loss associated with the missing device.

SUMMARY OF THE DESCRIPTION

Systems and methods for creating a new account for a user of a mobile device after installing a new application on the mobile device are described herein. Some embodiments are summarized in this section.

In one embodiment, a non-transitory storage medium stores computer-readable instructions, which when executed, cause a mobile device of a user to: receive a new application for remote installation on the mobile device; after the remote installation of the new application, monitor for an occurrence of an event on the mobile device; in response to a detection of the occurrence, automatically launch the new application, wherein the launch of the new application is a first execution of the new application on the mobile device; after the launch, execute the new application to automatically obtain data from the mobile device; and send the data to a first computing device configured to create an account for the user, and to provide a service associated with the account.

In one embodiment, a system includes: at least one processor; and memory storing instructions configured to instruct the at least one processor to: receive data from a mobile device of a user, wherein the mobile device is configured to monitor, after remote installation of a new application on the mobile device, for one of a plurality of events on the mobile device, to automatically launch, in response to a detection of a first event of the plurality of events, the new application, wherein the launch of the new application is a first execution of the new application on the mobile device, and to execute the new application to automatically provide the data during the first execution; and in response to receiving the data, automatically create an account for the user.

In one embodiment, a method includes: receiving data from a mobile device of a user, wherein the mobile device is configured to monitor, after remote installation of a new application on the mobile device, for one of a plurality of events on the mobile device, to automatically launch, in response to a detection of a first event of the plurality of events, the new application, wherein the launch of the new application is a first execution of the new application on the mobile device, and to execute the new application to automatically provide the data; in response to receiving the data, automatically creating an account for the user; and providing a service associated with the account, the service comprising causing, over a network, an action on the mobile device in response to an instruction received from the user.

In one embodiment, a method includes obtaining data corresponding to a mobile device of a user; creating an account for the user and authentication information for the account; and sending the authentication information to a messaging address of the user.

In one embodiment, a method for a mobile device of a user includes, in response to an event on the mobile device, obtaining an identifier of the user; sending the identifier to a first computing device configured to create an account for the user, wherein an address to be used for a notification to the user will be based on the identifier, and the notification is to include first authentication information associated with the account; and receiving, at the mobile device, second authentication information associated with the account.

In one embodiment, a system includes at least one processor; and memory storing instructions configured to instruct the at least one processor to: receive data from a mobile device of a user; in response to receiving the data, create an account for the user and authentication information for the account; and send the authentication information to a messaging address of the user.

In one embodiment, a method includes, in response to an event on a mobile device of a user, obtaining an identifier of the user; sending, via the mobile device, data to a first computing device, the data to be used for creating an account for the user and for creating authentication information for the account; and sending the authentication information via a message sent to a messaging address of the user.

In another embodiment, a method implemented in a data processing system includes: receiving, at a mobile device of a user, an application for remote installation on the mobile device; installing, via the mobile device, the application on the mobile device; executing the application on the mobile device, the executing comprising performing a function of the mobile device; and sending information to a computing device associated with the user.

In yet another embodiment, a method for remote installation of software on a mobile device of a user includes: determining an identifier for a computing device associated with the user; performing a function of the mobile device to obtain information regarding the mobile device; and sending the information for delivery to the computing device using the identifier.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
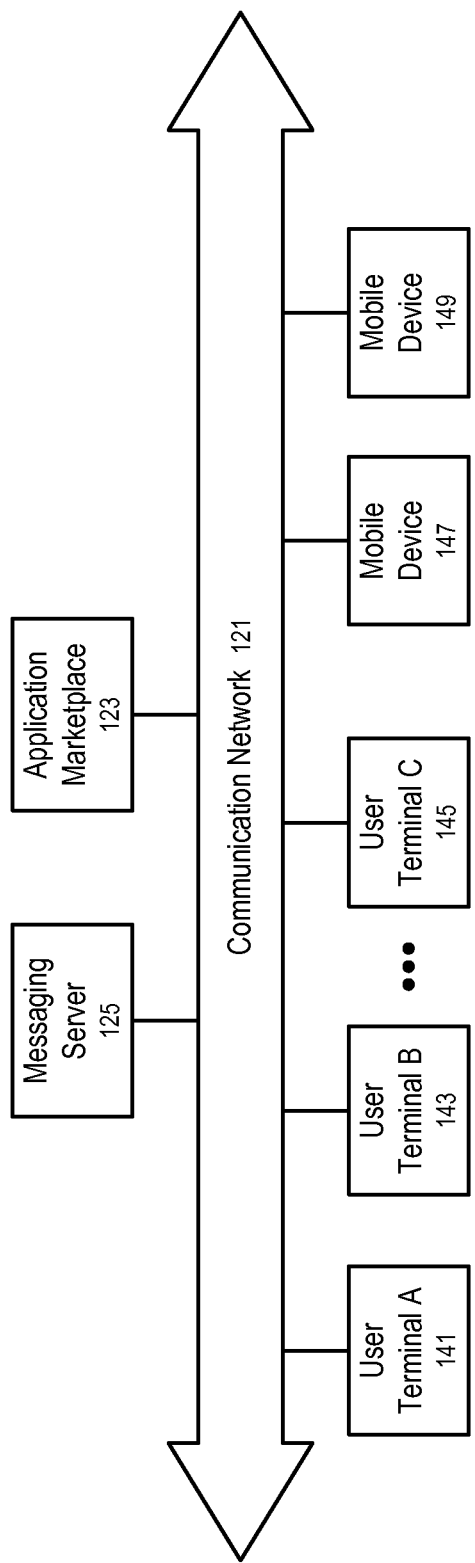
FIG. 1 shows a system in which user terminals and mobile devices communicate with a messaging server and/or an application marketplace according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It is desirable that both users and administrators be able to obtain remote access to a lost or stolen mobile device in order to secure the stored data, locate the mobile device, and provide feedback that confirms that the desired actions have successfully been executed. For users, it is desirable to be able to secure, control, and manage one or more personal devices. For administrators, it is desirable to be able to secure, control and manage a plurality of devices of multiple device types in order to be effective in an organization that has a heterogeneous mobile device deployment. At least one embodiment of the disclosure below provides for remote installation of an application for performing a function on a mobile device in order for a user to locate the device.

In one embodiment a mobile device of a user receives an application (e.g., an Android application package or .apk file) for remote installation on the mobile device (the user does not have to be in possession of the mobile device during the installation). For example, the owner of the mobile device may have selected the application from an application marketplace (e.g., the Android Market) for remote installation on an Android-based phone. It should be noted that the application marketplace may be, for example, one of many Android marketplaces (i.e., external markets that allow remote installation).

The application is remotely installed on the mobile device (e.g., using an Android marketplace). After this remote installation, the application is launched on the mobile device. During execution of the application, a function is performed on the mobile device to obtain or provide information or data (e.g., obtaining data from a global positioning system (GPS) module). The information/data is sent to the user (e.g., to an email account of the user on a messaging server; to a another hardware or computing device of the user, such as a secondary mobile phone; or to some other device, such as a laptop or personal computer). In one embodiment, the launching and/or execution of the application on the device may be initiated in response to an event on the mobile device (e.g., an activity on the mobile device such as, for example, receipt of a text or email message).

In one embodiment, the method further comprises receiving a message at the mobile device, and the executing the application is initiated on the mobile device in response to the receiving the message. In one embodiment, the message contains a predetermined text string that launches the application (e.g., a text message containing the word "locate"). In one embodiment, the mobile device is an Android-based phone that operates using the Android operating system.

In one embodiment, the mobile device comprises a position identification unit, the function is the obtaining of location data, and the executing the application further comprises obtaining a geographic location using the position identification unit. In other embodiments, additional and/or alternative sources of information (e.g., cell tower data) may be used to determine or obtain a location of the mobile device. Any of several conventional location techniques may be used by the mobile device.

In another embodiment, the function is the locking of access to the mobile device other than by use of a password of the user, or the creating of a loud sound using the phone. Other functions may be implemented depending on the hardware and other software available on the mobile device.

In one embodiment, the location and/or other information is sent to the user or owner of the mobile device in a message (e.g., a text or email message). In another embodiment, the information is sent to a computing device that is a messaging server storing a messaging account associated with the user, and the sending the information comprises sending a message to the messaging account.

In one embodiment, the application launches and automatically performs the function in response to an event (e.g., an action or another type of event such as a change in location of the mobile device) on the mobile device after the application has been installed on the mobile device. Examples of events include a change in location of the mobile device (e.g., as determined by a GPS unit), and a user turning on a screen of the mobile device.

In one example, Android devices are not currently designed for automatic launching of a newly-installed application. The mobile device is monitored for an event (e.g., an activity or intent) used to initiate launching or execution of the application. For example, the event on the mobile device may be selected from the group consisting of receipt of a message by the mobile device, an input provided by a user of the mobile device, an intent firing on the mobile device (for an Android device), the mobile device starting up, and an activation of a button or user interface element on the mobile device.

In one embodiment, the application or other software (e.g., when using operating systems other than the Android system) is configured to launch automatically after the remote installation by declaring itself as a background application or as wanting to receive one or more defined events.

In one embodiment for Android-based devices, monitoring for an event is accomplished by an application declaring an "intent-filter" for one of its components that tells the operating system that the application is interested in receiving notifications of particular types of events on the mobile device. When an event occurs that matches an intent-filter declared by the application, the operating system will start a component of the application that registered the intent-filter and provide information about the event (e.g., an Intent object) to the application.

In this embodiment, the application may register with the operating system to receive a variety of intents that are likely to occur on a device so that the application is started relatively soon after being installed on the device. The application does not necessarily register these intent-filters due to an interest in the particular events they correspond to, but rather so that a component of the application will start (i.e., begin executing in the operating system) so that the component (or another component of the application) can perform whatever function (e.g., locating the device) or action is desired as soon as possible after the application has been installed.

Some examples of monitoring include monitoring for the following events: an installation referrer callback by filtering for an intent with the name "com.android.vending.INSTALL_REFERRER"; a network connectivity change by filtering for an intent with the name "android.net.conn.CONNECTIVITY_CHANGE"; receiving an SMS message by filtering for an intent with the name "android.provider.Telephony.SMS_RECEIVED"; the device starting up by filtering for an intent with the name "android.intent.action.BOOT_COMPLETED"; and a press of the camera button by filtering for an intent with the name "android.intent.action.CAMERA_BUTTON".

Various examples of intents, among numerous other intents for the Android system, that may be monitored include the following representative examples:

<action android:name="com.android.vending.INSTALL_REFERRER"/>
<action android:name="com.lookout.labs.planb.intent.action.LAUNCHED"/>
<action android:name="android.bluetooth.intentaction.BONDING_CREATED"/>
<action android:name="android.bluetooth.intent.action.DISABLED"/>
<action android:name="android.bluetooth.intent action.DISCOVERY_STARTED"/>
<action android:name="android.bluetooth.intent.action.ENABLED"/>
<action android:name="android.bluetooth.intent.action.HEADSET_STATE_CHANGED"/>
<action android:name="android.bluetooth.intentaction.MODE_CHANGED"/>
<action android:name="android.netwifi.RSSI_CHANGED"/>
<action android:name="android.netwifi.SCAN_RESULTS"/>
<action android:name="android.netwifi.STATE_CHANGE"/>
<action android:name="android.netwifi.WIFI_STATE_CHANGED"/>
<action android:name="android.netwifi.supplicant.CONNECTION_CHANGE"/>
<action android:name="android.netwifi.supplicant.STATE_CHANGE"/>
<action android:name="android.intentaction.SCREEN_OFF"/>
<action android:name="android.intentaction.SCREEN_ON"/>
<action android:name="android.intentaction.USER_PRESENT"/>
<action android:name="android.intentaction.TIME_TICK"/>
<action android:name="android.intentaction.TIME_SET"/>
<action android:name="android.intentaction.DATE_CHANGED"/>
<action android:name="android.intentaction.TIMEZONE_CHANGED"/>
<action android:name="android.intentaction.PHONE_STATE"></action>
<action android:name="android.accounts.AccountAuthenticator"/>
<action android:name="android.accounts.LOGIN_ACCOUNTS_CHANGED"/>

```
<action                        android:name="android.
   intentaction.DOWNLOAD_COMPLETE"/>
<action                   android:name="android.intent.
   action.DOWNLOAD_NOTIFICATION_CLICKED"/>
<action                                       android:
   name="android.location.PROVIDERS_CHANGED"/>
<action                   android:name="android.speech.
   action.GET_LANGUAGE_DETAILS" I>
```

In another embodiment, on other operating systems (e.g., Apple's iOS operating system), an application or software on a mobile device can declare that it wants to receive location change events, so that the operating system wakes up the application whenever the location changes (e.g., new Wi-Fi networks determined to be in range of the mobile device, detection of cell tower changes, or detection of a location change by a GPS unit of the mobile device). For example, the iOS operating system also allows an application to declare that it is a VOIP application, and as such, the operating system will wake the application up based on a timer event (e.g., a timer period ending every 10 minutes; this time is configurable by the application). On the iOS operating system, whenever an application is woken up, it may choose to perform functions or actions for a limited period of time before it has to shut down again. This time period may be used to control, or used in conjunction with performing, the various functions and actions as described herein.

In other embodiments, the method further comprises sending a plurality of messages to the messaging account, with each of the plurality of messages including a link to a map indicating an updated location of the mobile device. The messages may be sent periodically to update the location for the user. The number of messages may be limited to a predetermined limit, and/or the time period in which messages are sent may be limited to a predetermined limit.

In one embodiment, the executing of the application comprises using an application programming interface (API) of an operating system of the mobile device to obtain an address associated with the messaging account, and the sending the message comprises sending the message to the address. For example, a message may be sent to another mobile device of the user or to a messaging server (e.g., to the user's Gmail address). The message may be selected from the group consisting of a text message, an email message, a video file, and a voice communication. In some embodiments, the message is a text message or email message that includes an embedded link to a map. The map includes a visual indication of the geographic location of the mobile device. The link may connect a computing device of the user to a server (e.g., Google map server) that is configured to provide the map on a web page in order to display the location of the mobile device to the user.

In one embodiment, a user visits a web server that provides a marketplace of applications. For example, the application may be received and installed as an Android package from an Android marketplace server. In one embodiment, the application has a size of less than 200 thousand bytes to better ensure downloading and installation in a shorter time period and/or with less power consumption. In one example, the first installed, lightweight application is an initial application followed by a second application with more full functionality. In response to receiving a new application for installation, the initial application is un-installed or removed from the mobile device and the new application is installed. For example, the new application is an expanded version of the initial application, and the new application has a size of greater than 500 thousand bytes.

In one embodiment, a computer-readable storage medium includes a software application, that when installed on a mobile device, causes the mobile device to: determine an account or email address of a user of the mobile device; perform a function on the mobile device to obtain information; and send the information to the account or email address. The application is configured for remote installation on the mobile device. For example, the application may be built as specified for other Android applications for use on the Android platform. The remote installation functionality itself is provided with the Android platform.

For example, the mobile device is configured to work with an application marketplace that enables remote installation. This requires that the application market provider (e.g., Google) has software running on the mobile device, a method to access the marketplace from a different device (e.g. a computer) other than the target mobile device, and an account management system that associates the user account of marketplace software on the mobile device with the market website/application that is accessible via the different device (e.g. a computer). Additionally, the marketplace provides the ability for a user to select an application on a computer and have it installed onto the mobile device.

In another embodiment, a system (e.g., an application marketplace server) includes memory storage to store several various applications for mobile devices including a first application. The system includes at least one processor coupled to access the memory and configured to perform a method comprising: receiving a selection of the first application from a user; and sending the first application for remote installation on a mobile device of the user, wherein the first selected application is configured to, after installation, execute a function on the mobile device to obtain information, and to send the information to a messaging account associated with the user.

In one embodiment, the receiving the selection comprises receiving input provided by the user via a web page (e.g., hosted by an Android marketplace server), and each of the applications offered is an Android application package for remote installation on a mobile device. In one example, the system provides a predetermined text string to the user. The text string is to be included by the user in a message sent to the mobile device after a selected application is installed. The receipt of the text string at the mobile device causes the launching or initiation of the selected application on the mobile device (i.e., in response to receipt by the mobile device of the message including the text).

In an alternative embodiment, a web server is used to provide information regarding a user's mobile device. The method comprises storing a plurality of applications for mobile devices including a first application; storing a messaging account for a user of a mobile device; receiving a selection of the first application from the user via a web page; sending a password to the user; sending the first application for remote installation on the mobile device, wherein the first application is configured to, after installation, execute a function on the mobile device to obtain data; and hosting a web page, accessible only via entry of the password, to present information to the user based on the data.

In one example, the function is the obtaining of location data for the mobile device, and the information presented to the user is the geographic location of the mobile device. In one example, the method further comprises creating the password in response to receiving a message sent by the first application after installation on the mobile device. The sent message includes information to identify the messaging account. In another example, the sending of the password comprises sending a message to the user including the password. Various specific embodiments are now discussed further below with reference to FIGS. 1-6.

FIG. 1 shows a system in which user terminals and mobile devices communicate with a messaging server and/or an application marketplace according to one embodiment. In FIG. 1, the user terminals (e.g., 141, 143, ..., 145) and/or mobile devices 147, 149 are used to access and communicate with application marketplace 123 (e.g., an Android marketplace) and/or to access messaging server 125 (e.g., an email server) over a communication network 121 (e.g., the Internet, a wide area network, or other communications network). Network 121 may be used to download and remotely install applications selected from marketplace 123 (e.g., using the Android Market). Marketplace 123 may include one or more web servers (or other types of data communication servers) to communicate with the user terminals (e.g., 141, 143, ..., 145) and mobile devices 147, 149.

As an example, an owner of an Android phone that has been lost (e.g., mobile device 147) may visit a web site hosted by marketplace 123 and select a phone-locating application for remote installation on mobile device 147. The user may authenticate itself to marketplace 123 by its email address (e.g., Gmail address) and password. Mobile device 147 sends a message to the user (e.g., to the user's Gmail address). The user then logs on to messaging server 125 via user terminal 141 to see the message. The message includes a link to a map server (e.g., Google maps) that provides an icon indicating the geographic location of the phone.

The marketplace 123 and/or messaging server 125 are connected to respective data storage facilities to store applications, messaging account data for users, user preference data, and other data. In FIG. 1, messaging server 125 is connected to communication network 121 to deliver messages (e.g., email or text) to user terminals 141-145 or one of a user's mobile devices 147, 149 (e.g., the mobile device that has not been lost by the user).

Although FIG. 1 illustrates an example system implemented in client-server architecture, embodiments of the disclosure can be implemented in various alternative architectures. For example, the application marketplace 123 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Figure 2:
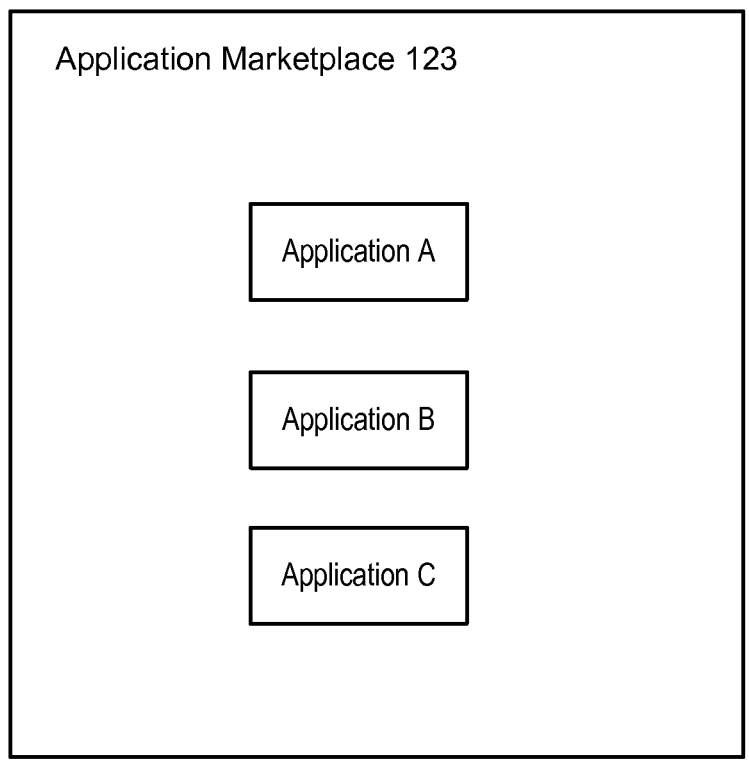
FIG. 2 shows an application marketplace offering multiple applications for remote installation on mobile devices according to one embodiment.

FIG. 2 shows a web page of application marketplace 123 offering multiple applications (A, B, C) for remote installation on mobile devices according to one embodiment. A user accesses the web page and selects an application for remote installation. The user may pay for the application on a web page provided by marketplace 123.

Figure 3:
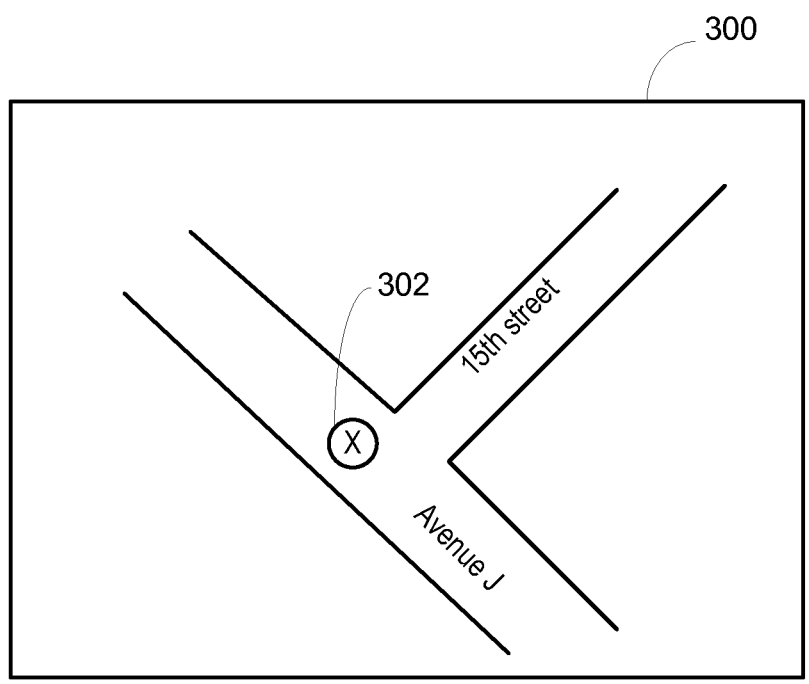
FIG. 3 shows a web page including a map that indicates the location of a mobile device according to one embodiment.

FIG. 3 shows a web page 300 including a map that indicates the location 302 of a mobile device as was described above. The map may be, for example, provided by a Google map server.

Figure 4:
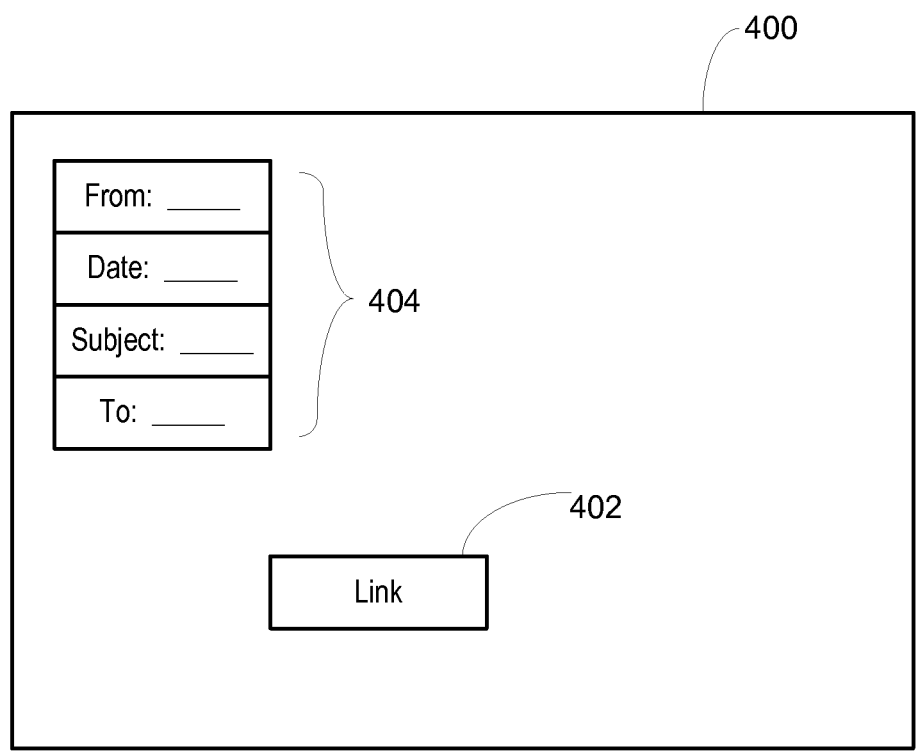
FIG. 4 shows an email message including a link to the map of FIG. 3 according to one embodiment.

FIG. 4 shows an email message 400 including a link 402 to the map of FIG. 3 according to one embodiment. Link 402, when activated by a message recipient, launches a page in a web browser that includes the map. The email message includes From:, To:, Subject:, and Date: fields 404. In another example, link 402 launches a Google Maps application on a phone, if the user is consuming this email on that phone. This may be the case where the user borrows a friend's phone in order to find the user's missing phone.

Additional information regarding various non-limiting examples, including determining the location of a mobile device, and sending and presenting information related to location for a user, is described in previously-published U.S. patent application having publication no. 2011/0047033 A1, published Feb. 24, 2011, entitled "SYSTEM AND METHOD FOR MOBILE DEVICE REPLACEMENT," by Mahaffey et al., the entire contents of which application is incorporated by reference as if fully set forth herein, and also in the Appendix A (titled "SYSTEM AND METHOD FOR MOBILE DEVICE REPLACEMENT") of previously-filed U.S. Provisional Application Ser. No. 61/445,957, filed Feb. 23, 2011, entitled "REMOTE APPLICATION INSTALLATION AND CONTROL FOR A MOBILE DEVICE," by Richardson et al., which was incorporated by reference above. This Appendix A also includes examples of a mobile device, a server, and a system architecture that may be adapted for use with some of the methods described herein. The exemplary information provided in this Appendix A does not limit the generality of the present disclosure.

Several non-limiting examples of the above systems and methods are now described below. In a first example, an application for locating a lost phone is selected and remotely installed on a phone of a user. After loading the application, the user sends an SMS message to the phone with the word "locate" in the message. The application locates the phone using GPS functionality of the phone and sends the location to the user's email account. It should be noted that in this example the user can locate its phone even though no locate application was installed prior to losing the phone. The location of the phone is provided on a Google map. The application sends a map link to the user's email address.

The application is installed using the Android Market service, which lets a user send applications to the user's phone from the web. Applications may be provided on a website such as, for example, https://market.android.com, which is accessible by a web browser.

After the application is installed, it starts locating the user's phone using cell towers and GPS, even if GPS was not switched on when the phone was lost (i.e., the application switches on the GPS functionality of the mobile device). The application continues to update the phone's location for a predetermined time period (e.g., 10 minutes) and to provide messages during this time period. A new time period can be started again by texting "locate" to the user's number from any other phone.

The application detects the user's email address, and sends the user a Google Maps link. For example, there is an API on Android-based mobile devices that enumerates all of the accounts that the mobile device is synced with. The installed application uses this API to determine the user's email address.

The user may receive up to a predetermined number (e.g., ten) email messages per cycle, so the user can see if the lost phone is moving or standing still. Each email message is, for example, sent via an SMS message. In another example, the mobile device may communicate with a server. The server then sends an email to an email address supplied to the server during the communication. In this example, only the user's phone can be located, and the application only sends the location to the user's email address. In this example, the application cannot be used to locate a phone of another person other than the user.

In one embodiment, the sending of messages to the user is implemented by SMS to email transport services provided by carriers. These carriers or another communication system that makes the SMS to email transition is used to operate the sending of messages to the user.

In another example, when the installed application first launches (by being downloaded remotely and activating due to intent firing or receipt of an SMS message), the application immediately detects the phone's email address. This address may or may not be an @gmail.com address, but the address will always be associated with a Google account of the user. The application immediately sends a message to this address, and subsequently sends location updates to the address.

Thus, the application permits a secure way to communicate with the legitimate owner of the phone without the user having to take any action (e.g., manual entering of information) on the phone itself. In prior approaches, a locate application would ask the user to enter an email address, but in this example, such user action is not required. In other words, the user does not have to specify whom the email message should be sent to—the application determines this automatically.

In another example, instead of merely sending an email or message as described in the example above, the identified email address, or other type of identifier, may be used to create an account on a server. This server is distinct from application marketplace 123 or messaging server 125 above. For example, this distinct server may be controlled by the developer of the application that is remotely installed on the user's mobile device, in which case the application may be configured to send data (e.g., obtained via the mobile device as described above) to the server, and the server is configured to pass that data on to the user. The distinct server automatically generates a password and sends it to the identified email address. For improved security, the user is requested to sign-in and change this password. At this point in the process, there is a completed user account, with user credentials and client-server capabilities, without the user's taking any action other than remotely installing the application as described above.

As an example of the above account creation, a user installs the application from an Android marketplace. The distinct server creates an account and emails the password to the user. The user receives the email and logs into the account. The user tracks its phone in real-time from a web page (e.g., by observing an updated location on a map display on a web page hosted by the distinct server—in one case, this may be the distinct server showing a map supplied by a Google server, or in another case this may be a map displayed on a Google server using location information supplied by the distinct server).

The distinct server also generally provides the user with remote access to the mobile device. This remote access may include the ability to perform various functions or actions on the phone (e.g., by selecting functions to execute from a list of functions displayed to the user on a web page). A web page hosted by the distinct server may provide the user with the ability to configure reports of information or data that are sent to the distinct server and/or otherwise to a device of the user. This configuration may include parameters such as frequency of report. The distinct server may provide the user with remote access to the mobile device to perform other functions or actions such as scream or play a sound using the device, lock or block access to the device, wipe data from the device, backup data from the device to another computing device, and/or locate the device (e.g., see various mobile device functions and actions described in Appendix A of previously-filed U.S. Provisional Application Ser. No. 61/445,957 referenced above, which may be implemented via the user's remote access as hosted by the distinct server; also see U.S. Patent Application Publication No. 2010/0210240, titled SYSTEM AND METHOD FOR REMOTELY SECURING OR RECOVERING A MOBILE DEVICE, by Mahaffey et al., published Aug. 19, 2010, the entire contents of which application is incorporated by reference as if fully set forth herein).

In another embodiment using the distinct server, the following three elements may be associated: An instance of an application on a mobile device, an email address and associated account (e.g., a Google Gmail account), and a third-party web-based application (e.g., hosted by the distinct server).

In one example, this method may be used for a photo-sharing site as follows:

(1) An application is downloaded to a mobile device (e.g., an Android smartphone), and the user takes a photo with the application.
(2) The application detects the email address of the phone.
(3) The application communicates the email address and the phone's ID number to the web-based application (at the distinct server). The application on the mobile device also uploads the photo.
(4) The web-based application creates an account for the user and generates a password. The web-based application also stores the photo.
(5) The login information for the new account of the user is emailed from the distinct server to the user's email address.
(6) The user logs in to the account using those credentials (e.g., via network communication using a web browser application on the mobile device or another computing device of the user such as a laptop or tablet computer).
(7) The user views (e.g., using the web browser application) its uploaded photo on a web page hosted by or associated with the distinct server. In this example, the user may be talking on its phone during the entire time of the above method (e.g., talking while taking the photo, doing the uploading, and viewing the photo), using the newly-downloaded application, the user's email application, and the web browser application.

As an example of one of the ways to launch the application after installation on the mobile device (done in this example because the automatic launching of a newly-downloaded application is not a built-in feature of the Android phone) the application registers to receive notifications for events on the phone (e.g., background activity like receiving a text message, engaging the network connection, or receiving a phone call). For example, when the event occurs, the operating system starts the application to perform the notification to the user. The application monitors for any activity whatsoever, which causes the application to launch. As an example, Android phones permit the watching for events (e.g., actions) on the phone, and the performing of a function or taking of an action based on an observed event.

The application watches for any event (e.g., for any intent when the mobile device is based on the Android system), and then starts up whenever that event is called. For example, an intent to send a text message may be detected. Instead of waiting for a specific intent, the application waits for any intent (i.e., any intent that gets called on the mobile device). The application intercepts this call and uses that as a basis to launch the application. In other embodiments (e.g., that do not use the Android system) any sort of notification/callback system may be used to start an application. For example, the background location change or the VOIP socket keep-alive features on iOS.

Now, another example is provided below with further details regarding the functions of the application on the mobile device, and the manner in which the application interacts with the Android operating system running on the mobile device. In this example, the application performs the following functions:

Watches for one or more events (e.g., intents or other actions), and the application launches when it sees one of these events.

The application immediately reads the email address.

The application reads the carrier that is configured on the phone.

Depending on the carrier, the application chooses a method to compose an SMS message (alternatively, a server component could be included in the application). Each carrier has a different SMS-to-email conversion mechanism. The application is configured to select a method to use based on the particular carrier.

The application silently (i.e., without user notification or manual user action) opens the SMS system and composes and sends the SMS message. The content of the SMS message begins with an email address. The SMS message is sent to the carrier.

The carrier detects the email, which causes the carrier to take the rest of the content, compose an email message to that email address, and include the content as the body of the message. This first message is sent, notifying the user that the process has started and linking the user to a website (e.g., mylookout.com) for more info.

The application checks to see if a GPS unit on the mobile device is turned on. If it is not turned on, the application turns it on. The application attempts to locate the phone using standard Android location determination methods.

When a location is detected, the application composes an SMS message using the method above.

The application converts a latitude-longitude (lat-long) location to a map (e.g., Google Maps) link.

The SMS message contains a "sponsor" label, the map link, an accuracy for the location in meters, and a link to the above website (e.g., mylookout.com).

If the message is too long to fit in a text message, the application removes the least relevant information (e.g., labels and secondary links) from the message until it can fit in an SMS text message.

Additional SMS messages are sent when a more accurate location is found, though messages are not sent more often than is configured. Messages may be sent, for example, more than 60 seconds apart.

SMS messages are sent for a set period of time after the request.

Figure 5:
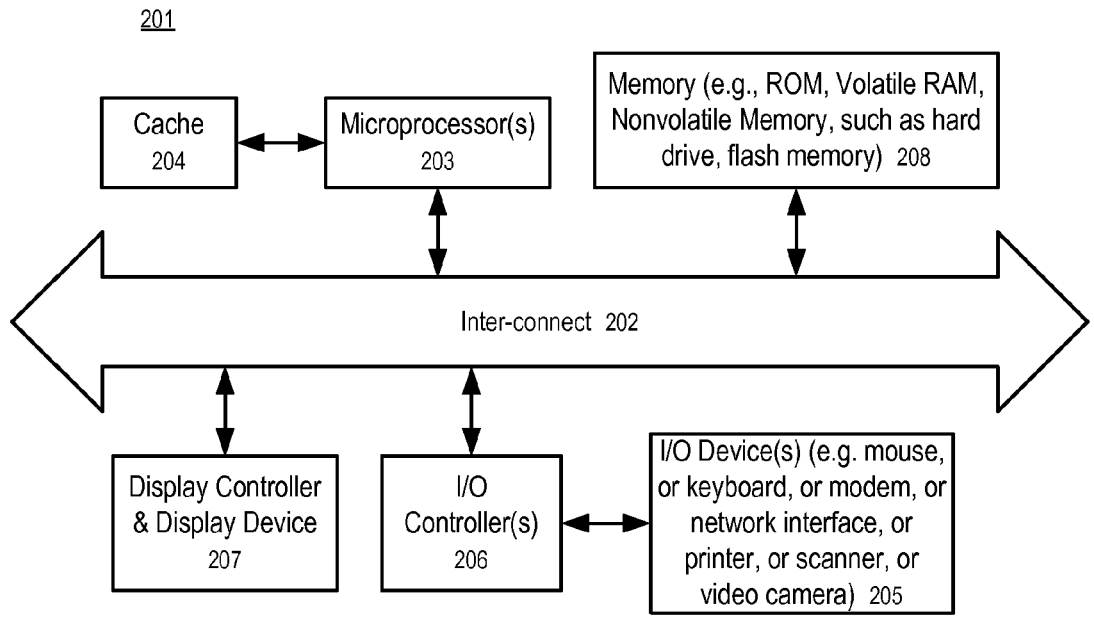
FIG. 5 shows a block diagram of a data processing system (e.g., a messaging server or an application server) which can be used in various embodiments.

FIG. 5 shows a block diagram of a data processing system (e.g., a messaging server or an application server) which can be used in various embodiments. While FIG. 5 illustrates various components of a computer system, it is not intended to represent any particular architecture or manner of interconnecting the components. Other systems that have fewer or more components may also be used.

In FIG. 5, the system 201 includes an inter-connect 202 (e.g., bus and system core logic), which interconnects a microprocessor(s) 203 and memory 208. The microprocessor 203 is coupled to cache memory 204 in the example of FIG. 5.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 5 is used to implement application marketplace 123, messaging server 125, and/or other servers.

In another embodiment, a data processing system as illustrated in FIG. 5 is used to implement a user terminal or a mobile device. A user terminal may be in the form, for example, of a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 6:
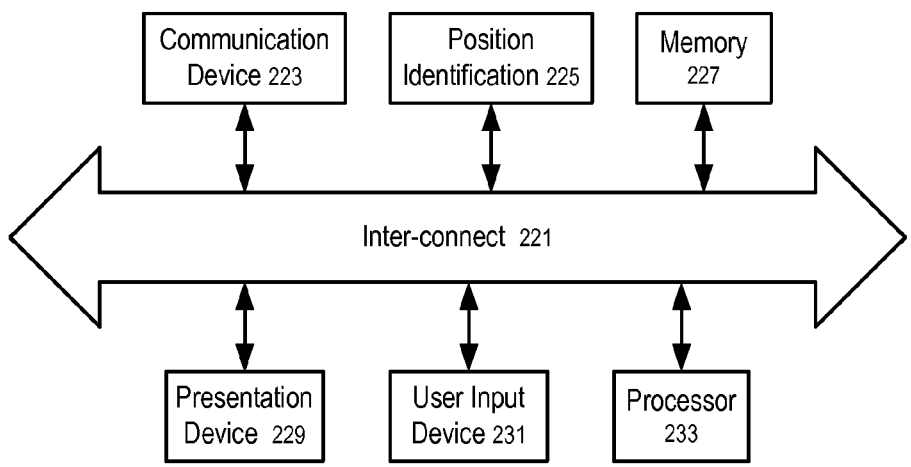
FIG. 6 shows a block diagram of a user device (e.g., a mobile device) according to one embodiment.

FIG. 6 shows a block diagram of a user device (e.g., a mobile device) according to one embodiment. In FIG. 6, the user device includes an inter-connect 221 connecting the presentation device 229, user input device 231, a processor 233, a memory 227, a position identification unit 225 and a communication device 223.

In FIG. 6, the position identification unit 225 is used to identify a geographic location. The position identification unit 225 may include a satellite positioning system receiver, such as a Global Positioning System (GPS) receiver, to automatically identify the current position of the user device.

In FIG. 6, the communication device 223 is configured to communicate with a network server to provide data, including location data (e.g., sending a message with a link to a map to messaging server 125). In one embodiment, the user input device 231 is configured to receive or generate user data or content. The user input device 231 may include a text input device, a still image camera, a video camera, and/or a sound recorder, etc.

Various additional embodiments are now described in more detail below. In one embodiment, a non-transitory computer-readable storage medium stores computer-readable instructions, which when executed, cause a mobile device of a user to: in response to an event on the mobile device, obtain an identifier of the user; send the identifier to a first computing device configured to create an account for the user, wherein an address to be used for a notification to the user will be based on the identifier, and the notification is to include first authentication information associated with the account; and receive, at the mobile device, second authentication information associated with the account.

In one embodiment, the receiving the authentication information comprises receiving the notification. In one embodiment, the instructions further cause the mobile device to send the second authentication information to a second computing device. In one embodiment, the instructions further cause the mobile device to send the second authentication information via a message sent to a messaging address (e.g., an email address) of the user.

In one embodiment, prior to sending the identifier, an application has been remotely installed on the mobile device (e.g., from an application marketplace server), and the instructions further cause the mobile device to execute the application on the mobile device to obtain the identifier.

In one embodiment, the event is selected from the group consisting of: receipt of a message by the mobile device, providing of an input by the user on the mobile device, firing of an intent on the mobile device, starting up of the mobile device, activation of a button or user interface element on the mobile device, a change in location of the mobile device, and user activation of a display screen of the mobile device.

In one embodiment, the first authentication information and the second authentication information are the same. In one example, the first authentication information includes a user name and a password, and the second authentication information includes a random token for authentication of the mobile device. In another embodiment, the instructions further cause the mobile device to generate third authentication information and send the third authentication information to the first computing device.

In one embodiment, the notification is to further include the third authentication information. In one embodiment, the notification is to further include fourth authentication information different from the third authentication information.

In one embodiment, the first authentication information and the third authentication information are the same. In one embodiment, the third authentication information is a random password, the account is created based on the identifier and the random password, the address to be used for the notification is an email address, the notification is an email to be sent by the first computing device to the email address, and the email is to include the identifier and the random password.

In one embodiment, the instructions further cause the mobile device to randomly generate a first password for communications with the first computing device, and the first authentication information further includes a second password randomly-generated by the first computing device for the user to login to the first computing device. For example, the identifier may be an address (e.g., an email address).

In one embodiment, the instructions further cause the mobile device to store the authentication information, and use the authentication information to log into a web service associated with the account.

In one embodiment, the first computing device (e.g., the distinct server) is configured to provide a web service associated with the account. In one embodiment, the web service is a remote access service permitting the user to remotely perform an action on the mobile device. In one embodiment, the web service is a photo sharing service comprising storing of photos provided by the user, and the instructions further cause the mobile device to provide access to the photos by at least one person authorized by the user. In another embodiment, the web service is a service selected from the group consisting of: a policy management service, and a diagnostics data gathering service.

In one embodiment, the instructions further cause the mobile device to, in response to an instruction sent from a second computing device associated with the account, perform a function of the mobile device to obtain first information.

In one embodiment, the first computing device and the second computing device are the same.

In one embodiment, the identifier is a first address, and the instructions further cause the mobile device to send the first information to a third computing device or to the first address.

In one embodiment, the first computing device and third computing device are the same. In another embodiment, the second computing device and the third computing device are the same.

In one embodiment, the instructions further cause the mobile device to, in response to an instruction sent from the second computing device, perform a function selected from the group consisting of: playing a sound, locking user interface access to the mobile device, blocking wireless access to the mobile device, wiping data from a memory of the mobile device, backing-up data from the mobile device to another computing device, locating the mobile device, and combinations of the foregoing.

In one embodiment, a system includes at least one processor; and memory storing instructions configured to instruct the at least one processor to: receive data from a mobile device of a user; in response to receiving the data, create an account for the user and authentication information for the account; and send the authentication information to a messaging address of the user.

In one embodiment, the data comprises the messaging address and an identification number of the mobile device. For example, the messaging address is an email address. As another example, the messaging address is associated with the mobile device and a computing device of the user.

In one embodiment, the sending the authentication information comprises sending an email via a messaging server to the computing device of the user.

In one embodiment, the instructions are further configured to instruct the at least one processor to, subsequent to creating the account, log in the user to the account.

In one embodiment, the instructions are further configured to instruct the at least one processor to, subsequent to creating the account, provide the user with remote access to the mobile device. In one embodiment, the instructions are further configured to instruct the at least one processor to provide a web service associated with the account. For example, the web service is a remote access service permitting the user to remotely perform an action on the mobile device. In another example, the web service is a photo sharing service comprising storing of photos provided by the user, and the instructions are further configured to instruct the at least one processor to provide access to the photos by at least one person authorized by the user.

In one embodiment, a method includes obtaining data corresponding to a mobile device of a user; creating an account for the user and authentication information for the account; and sending the authentication information to a messaging address of the user. In one embodiment, the obtaining the data comprises receiving the data from the mobile device of the user, and the creating the account is performed in response to receiving the data. In one embodiment, the sending comprises sending by a computing device other than the mobile device, and the obtaining the data comprises receiving the data from the user via the computing device after the user has logged into the computing device.

In one embodiment, the method further includes providing a service associated with the account, wherein the service comprises performing, over a network, an action on the mobile device in response to an instruction received from the user.

In one embodiment, prior to performing the action, an application has been remotely installed on the mobile device, and the method further comprises causing the mobile device to execute the application in order to perform the action.

In one embodiment, a method includes, in response to an event on a mobile device of a user, obtaining an identifier of the user; sending, via the mobile device, data to a first computing device, the data to be used for creating an account for the user and for creating authentication information for the account; and sending the authentication information via a message sent to a messaging address of the user. In one embodiment, the method further includes performing, based on an instruction received from the user via a computing device other than the mobile device, an action on the mobile device, wherein the action corresponds to a service associated with the account.

In an alternative embodiment, the authentication information for the mobile device may be the phone number of the mobile device. On the distinct server, the user may enter the phone number of the device. The mobile device does not need to send the phone number to the distinct server, nor does the distinct server need to send any information to the mobile device. The distinct server is configured to contact any mobile device with the remotely-installed software using only a phone number (e.g., via SMS, a phone call, etc.). The user manually enters the phone number into the server when the user wants to connect to the user's device. Instead of the user's phone number, the user's email address or another identifier of the user may be used as authentication information that both the user and the mobile device would know.

In yet another alternative embodiment, the remotely-installed software may open a communication protocol on the mobile device after the software runs. The remotely-installed software may be configured, for example, to listen for commands sent via SMS from the user's or another phone number, or to open a specific port and execute commands from that port. The account that is created resides entirely on the mobile device, and the distinct server is capable of talking to arbitrary devices that have had this software installed.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A non-transitory storage medium storing computer-readable instructions, which when executed, cause a mobile device of a user to:
   receive a new application for remote installation on the mobile device;
   after the remote installation of the new application, monitor for an occurrence of an event on the mobile device;
   in response to a detection of the occurrence, automatically launch the new application, wherein the launch of the new application is a first execution of the new application on the mobile device;
   after the launch, execute the new application to automatically obtain data from the mobile device; and
   send the data to a first computing device configured to create an account for the user, and to provide a service associated with the account.

2. The non-transitory storage medium of claim 1, wherein the instructions further cause the mobile device to store authentication information associated with the account, and use the authentication information to log into the service.

3. The non-transitory storage medium of claim 1, wherein the data is an identifier of the user, the data is obtained from the mobile device during the first execution, and the data is sent to the first computing device during the first execution.

4. The non-transitory storage medium of claim 3, wherein an address to be used for a notification to the user will be based on the identifier, the notification is to include first authentication information associated with the account, and the instructions further cause the mobile device to receive second authentication information associated with the account.

5. The non-transitory storage medium of claim 3, wherein the data further comprises an identification number of the mobile device.

6. The non-transitory storage medium of claim 1, wherein the instructions further cause the mobile device to display, via a web browser, a web page to the user, the web page associated with the first computing device, and the web page comprising data previously sent from the mobile device to the first computing device.

7. The non-transitory storage medium of claim 1, wherein the instructions further cause the mobile device to receive parameters from the user for configuration of the service, and send the parameters to the first computing device.

8. The non-transitory storage medium of claim 1, wherein the instructions further cause the mobile device to, in response to an instruction sent from a second computing device associated with the account, perform a function of the mobile device to obtain information.

9. A system, comprising:
   at least one processor; and
   memory storing instructions configured to instruct the at least one processor to:
     receive data from a mobile device of a user, wherein the mobile device is configured to monitor, after remote installation of a new application on the mobile device, for one of a plurality of events on the mobile device, to automatically launch, in response to a detection of a first event of the plurality of events, the new application, wherein the launch of the new application is a first execution of the new application on the mobile device, and to execute the new application to automatically provide the data during the first execution; and
     in response to receiving the data, automatically create an account for the user.

10. The system of claim 9, wherein the data comprises a messaging address of the user and an identification number of the mobile device.

11. The system of claim 9, wherein the instructions are further configured to instruct the at least one processor to, subsequent to creating the account, log in the user to the account.

12. The system of claim 9, wherein the instructions are further configured to instruct the at least one processor to, subsequent to creating the account, provide the user with remote access to the mobile device.

13. The system of claim 9, wherein the instructions are further configured to instruct the at least one processor to provide a web or network service associated with the account.

14. The system of claim 13, wherein the service is a remote access service permitting the user to remotely perform an action on the mobile device.

15. The system of claim 13, wherein the service is a photo sharing service comprising storing of photos provided by the user.

16. A method, comprising:
   receiving data from a mobile device of a user, wherein the mobile device is configured to monitor, after remote installation of a new application on the mobile device, for one of a plurality of events on the mobile device, to automatically launch, in response to a detection of a first event of the plurality of events, the new application, wherein the launch of the new application is a first execution of the new application on the mobile device, and to execute the new application to automatically provide the data;
   in response to receiving the data, automatically creating an account for the user; and
   providing a service associated with the account, the service comprising causing, over a network, an action on the mobile device in response to an instruction received from the user.

17. The method of claim 16, further comprising causing the mobile device to execute the new application in order to perform the action.

18. The method of claim 16, further comprising sending authentication information associated with the account to the mobile device.

19. The method of claim 16, wherein the data is automatically provided during the first execution of the new application.

20. The method of claim 16, wherein the service further comprises a policy management service.

* * * * *

UNITED STATES PATENT AND TRADEMARK OFFICE
CERTIFICATE OF CORRECTION

| | |
|---|---|
| PATENT NO. | : 9,288,608 B2 |
| APPLICATION NO. | : 14/553832 |
| DATED | : March 15, 2016 |
| INVENTOR(S) | : Richardson et al. |

Page 1 of 1

It is certified that error appears in the above-identified patent and that said Letters Patent is hereby corrected as shown below:

In the specification

In Column 1, Line 9, delete "2012," and insert -- 2012, now Pat. No. 8,938,810, --, therefor.

In Column 6, Line 26, delete "intentaction." and insert -- intent.action. --, therefor.

In Column 6, Lines 29-30, delete "intentaction." and insert -- intent.action. --, therefor.

In Column 6, Line 36, delete "intentaction." and insert -- intent.action. --, therefor.

In Column 6, Line 50, delete "intentaction." and insert -- intent.action. --, therefor.

In Column 6, Line 52, delete "intentaction." and insert -- intent.action. --, therefor.

In Column 6, Line 54, delete "intentaction." and insert -- intent.action. --, therefor.

In Column 6, Line 56, delete "intentaction." and insert -- intent.action. --, therefor.

In Column 6, Line 57, delete "intentaction." and insert -- intent.action. --, therefor.

In Column 6, Line 59, delete "intentaction." and insert -- intent.action. --, therefor.

In Column 6, Line 61, delete "intentaction." and insert -- intent.action. --, therefor.

In Column 6, Line 63, delete "intentaction." and insert -- intent.action. --, therefor.

In Column 7, Line 2, delete "intentaction." and insert -- intent.action. --, therefor.

Signed and Sealed this
Thirty-first Day of May, 2016

Michelle K. Lee
*Director of the United States Patent and Trademark Office*